US012253232B1

(12) United States Patent
Ales et al.

(10) Patent No.: US 12,253,232 B1
(45) Date of Patent: Mar. 18, 2025

(54) MOTOR VEHICLE ILLUMINATION DEVICE WITH IMPROVED ASPECT

(71) Applicant: PO Lighting Czech, s.r.o., Senov u Nehovo Jicina (CZ)

(72) Inventors: Raska Ales, Senov u Noveho Jicina (CZ); Dominik Machu, Senov u Noveho Jicina (CZ); Wilfried Dejmek, Senov u Noveho Jicina (CZ)

(73) Assignee: PO Lighting Czech, s.r.o., Senov u Noveho Jicina (CZ)

( * ) Notice: Subject to any disclaimer, the term of this patent is extended or adjusted under 35 U.S.C. 154(b) by 0 days.

(21) Appl. No.: 18/829,543

(22) Filed: Sep. 10, 2024

(51) Int. Cl.

| | |
|---|---|
| ***F21S 41/55*** | (2018.01) |
| ***F21S 41/151*** | (2018.01) |
| ***F21S 41/19*** | (2018.01) |
| ***F21S 41/32*** | (2018.01) |
| ***F21S 43/14*** | (2018.01) |
| ***F21S 43/19*** | (2018.01) |
| ***F21S 43/31*** | (2018.01) |
| ***F21S 43/50*** | (2018.01) |

(52) U.S. Cl.
CPC ............. *F21S 41/55* (2018.01); *F21S 41/151* (2018.01); *F21S 41/192* (2018.01); *F21S 41/32* (2018.01); *F21S 43/14* (2018.01); *F21S 43/195* (2018.01); *F21S 43/31* (2018.01); *F21S 43/51* (2018.01)

(58) Field of Classification Search
CPC ...................... F21S 41/14-55; F21S 43/14-51
See application file for complete search history.

(56) References Cited

U.S. PATENT DOCUMENTS

| | | | | |
|---|---|---|---|---|
| 5,436,809 A | 7/1995 | Brassier et al. | | |
| 6,796,695 B2 * | 9/2004 | Natsume | F21S 43/31 | 362/346 |

FOREIGN PATENT DOCUMENTS

| | | |
|---|---|---|
| DE | 102019127082 A1 | 4/2021 |
| JP | S6258501 A | 3/1987 |
| JP | H 0845306 A | 2/1996 |
| JP | 4066702 B | 3/2008 |

OTHER PUBLICATIONS

Extended Search Report from European Patent Office dated Jan. 9, 2024.

* cited by examiner

*Primary Examiner* — Jason M Han

(57) ABSTRACT

This illuminating device (2) is adapted for vehicle exteriors and comprises a reflecting device (6) comprising n chambers (10) aligned along a main axis of the reflecting device (6), with n being an integer superior or equal to 2, each chamber (10) comprising a reflecting surface (14), —a support (16), m light sources, with m being an integer strictly inferior to n, arranged on the support (16) and configured to illuminate the reflecting device (6), each light source being associated with one different chamber (10), and n-m decorative pieces (24) arranged on the support (16), each decorative piece (24) being associated with one different chamber (10) such that each chamber (10) is associated with either a light source or a decorative piece (24).

9 Claims, 2 Drawing Sheets

[Fig. 1]
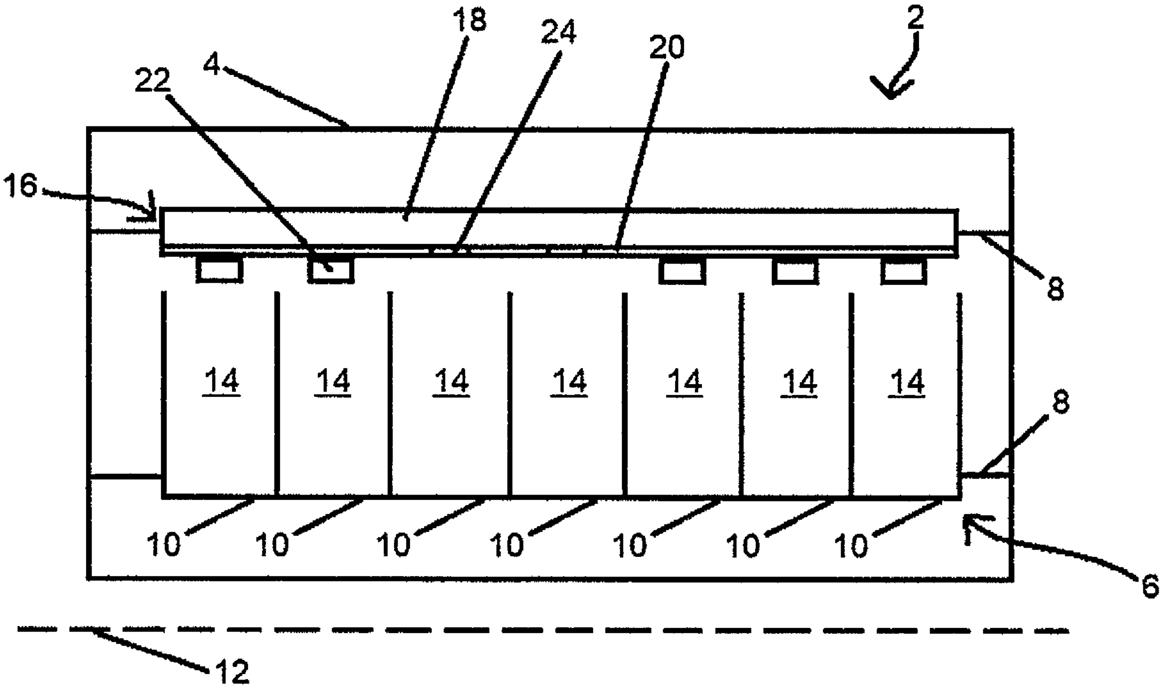
[Fig. 2]
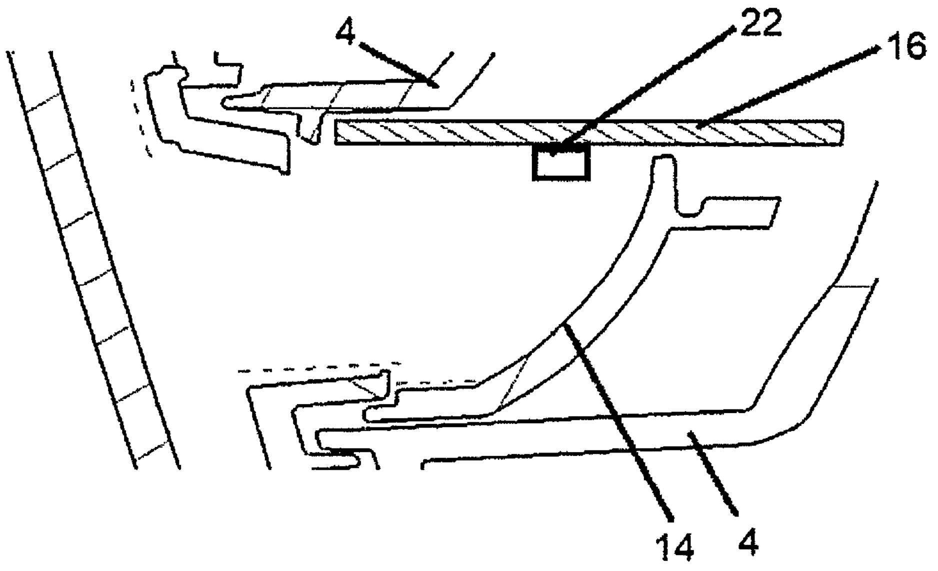

[Fig. 3]
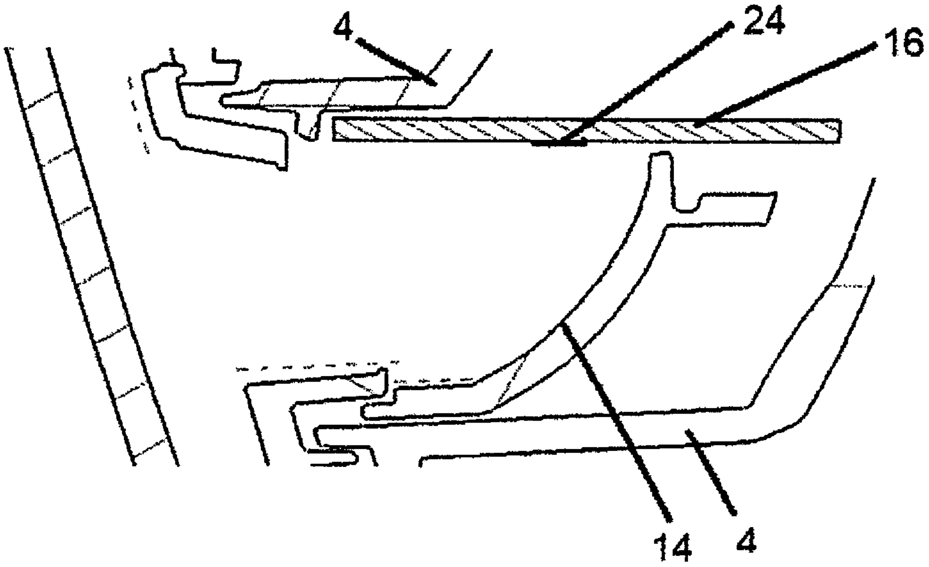
[Fig.4]
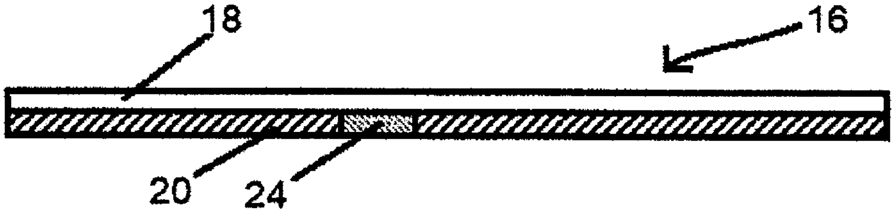

MOTOR VEHICLE ILLUMINATION DEVICE WITH IMPROVED ASPECT

BACKGROUND OF THE INVENTION

The invention relates to the domain of the automotive industry, and particularly to a vehicle lamp. More specifically, the invention relates to an illuminating device adapted for vehicle exteriors and to an automotive vehicle lamp comprising such an illuminating device.

Many car models now include illuminating devices of a type which generally comprise a reflecting device, comprising several chambers equipped with a reflecting surface, coupled with light sources populated on a printed circuit board. The light sources emit light towards the reflecting surfaces of the chambers so that it is reflected to illuminate the area in front of the illuminating device.

It is further known to use light emitting diodes as light sources as they can produce high intensity light, which makes it easier to fulfill the photometry specifications imposed on the illuminating device. The use of light emitting diodes as light sources even makes it possible to fulfill the photometry specifications without having to provide a light source for each of the chambers of the reflecting device. This allows the reduction of the production cost and complexity of the illuminating device.

However, this comes with a drawback. Indeed, when the light sources are in an off state, in which they do not emit light, for example when the vehicle equipped with the illuminating device is parked, a person in front of the vehicle observing the illuminating device can see the reflection produced by the reflecting surfaces. Because the illuminating device comprises fewer light sources than chambers, some of the reflecting surfaces reflect an image of the light sources in the off state, while others reflect a portion of the printed circuit board which forms a dark shade. As a result, the person sees a disharmonious image through the reflection of the reflecting device which undermines the esthetical aspect of the illuminating device and, ultimately, of the vehicle.

To overcome this drawback, it is possible to provide the illuminating device with additional light sources so that each of the chambers of the reflecting device is associated with one light source, restoring harmony in the image reflected by the reflecting device when the light sources are in the off state. But as explained above, these additional lights sources are not needed to fulfill the photometry specifications of the illuminating device, such that they represent an added cost for manufacturing the illuminating device, which is preferable to avoid.

There exists a need to improve the aspect of the illuminating device when the light sources are in the off state in a manner as cost-effective as possible.

BRIEF SUMMARY OF THE INVENTION

To this end, it is provided according to the invention an illuminating device adapted for vehicle exteriors, comprising:

- a reflecting device comprising n chambers aligned along a main axis of the reflecting device, with n being an integer superior or equal to 2, each chamber comprising a reflecting surface,
- a support,
- m light sources, with m being an integer strictly inferior to n, arranged on the support and configured to illuminate the reflecting device, each light source being associated with one different chamber, and
- n-m decorative pieces arranged on the support, each decorative piece being associated with one different chamber such that each chamber is associated with either a light source or a decorative piece.

Thus, the chambers of the reflecting device not associated with one of the light sources are instead associated with one of the decorative pieces. As such, when the light sources are in the off state, the reflecting surfaces either reflect the image of a light source or of a decorative piece. By designing the decorative pieces to have an appearance similar to one of the light sources in the off state, it is possible to create a harmonious image reflected by the reflection device. This prevents the illuminating device from undermining the aspect of the vehicle when the light sources are in the off state.

Furthermore, it is understood that decorative pieces can easily be made less expensive than light sources, which demonstrates that the invention is more cost-effective than the solution previously mentioned. In addition, unlike the light sources, the decorative pieces are passive elements that do not need to be electrically powered. This means that the decorative pieces allow the saving of energy and allow an easier connection to the support, as they do not need to be electrically connected to it.

Advantageously, the light sources comprise light-emitting diodes.

Light-emitting diodes facilitate the fulfilment of the photometry specifications imposed on the illuminating device.

Advantageously, the light sources and the decorative pieces are each arranged in front of the reflecting surface of the chamber they are associated with.

This configuration ensures that a person observing the illuminating device sees the reflection of the decorative pieces through the reflecting surfaces.

Advantageously, the support is a printed circuit board which comprises a conductive layer and a solder mask arranged on the conductive layer, the solder mask being dark-coloured, preferably black-coloured.

Preferably, the light sources are arranged on the solder mask.

Because it is dark-coloured, the solder mask itself is not visible through reflection on the reflecting surfaces, so that it does not undermine the aspect of the illuminating device.

Preferably, the solder mask comprises holes each configured to receive one of the decorative pieces.

It is thus easy to position the decorative pieces within the illuminating device when it is being manufactured.

Advantageously, the decorative pieces are made of tin.

The decorative pieces are thus cheap to produce while being able to have a similar appearance to that of the light sources when they are in the off state.

Advantageously, each decorative piece is positioned either at a focal area of the reflecting surface of the chamber it is associated with or within a distance, equal to the greatest dimension of the decorative piece, of said focal area.

This contributes in producing reflected images of the decorative pieces through the reflecting surfaces that are similar to the reflected images of the light sources when they are in the off state.

Advantageously, the decorative pieces are the same size of the light sources, smaller than the light sources or up to twice bigger than the light sources.

The decorative pieces can thus be made as compact as the light sources or, even, more compact than the light sources. Alternatively, the decorative pieces can be made bigger than the light sources if needed.

BRIEF DESCRIPTION OF THE DRAWINGS

The invention will be better understood upon reading the following description, which is given only as an example and is made with reference to the attached drawings in which:

FIG. 1 is a schematical front view of an illuminating device according to an embodiment of the invention, FIG. 2 is a sectional view of a chamber of the illuminating device of FIG. 1 associated with a light source, FIG. 3 is a sectional view of a chamber of the illuminating device of FIG. 1 associated with a decorative piece, and FIG. 4 is a sectional view of a printed circuit board of the illuminating device of FIG. 1.

DETAILED DESCRIPTION OF THE INVENTION

FIG. 1 represents an illuminating device 2 according to an embodiment of the invention. The illuminating device 2 is intended to be integrated in an automotive vehicle and is adapted for vehicle exteriors. As such, the illuminating device 2 may be part of an automotive vehicle lamp. The illuminating device 2 comprises a frame 4 which can be inserted into a vehicle and secured to a frame thereof.

The illuminating device 2 comprises a reflecting device 6 attached to the frame 4 by the means of connecting means 8 suitable for securing the reflecting device 6 to the frame 4. The reflecting device 6 comprises n chambers 10 aligned along a main axis 12 of the reflecting device 6, with n being an integer superior or equal to 2. The main axis 12 is perpendicular to the front direction of the illuminating device. Here, the reflecting device 6 comprises seven chambers 10. Each of the chambers 10 comprises a reflecting surface 14 which is partially oriented towards a front side of the illuminating device 2. The reflecting surfaces 14 are configured to fully reflect light having a wavelength comprised in the visible spectrum. The chambers 10 are separated one from another by an opaque wall configured to prevent light from traveling directly from one chamber to another.

The illuminating device 2 comprises a support 16 formed by a printed circuit board attached to the frame 4 by the means of connecting means 8 suitable for securing the printed circuit board 16 to the frame 4 so that the support 16 is facing the reflecting device 6. The printed circuit board 16 comprises a conductive layer 18, here made of copper, and a solder mask 20 made of a dark-coloured material, here a black-coloured material. The solder mask 20 is facing the reflecting device 6. The printed circuit board 16 is configured to be easily connectable to a power supply unit and to a command unit which may be provided by an automotive vehicle.

The illuminating device 2 comprises m light sources 22, configured to illuminate the reflecting device 14, arranged on the printed circuit board 16, with m being an integer strictly inferior to n. Here, the illuminating device comprises five light sources 22, and the light sources 22 comprise light emitting diodes. FIG. 2 illustrates a portion of the illuminating device 2 comprising one of these light sources 22. The light sources 22 are arranged on the solder mask 20 and electrically connected to the conductive layer 18 of the printed circuit board 16. Each of the light sources 22 is associated with one different chamber 10 of the reflecting device 6. In other words, each light source 22 is associated with only one chamber 10, and each chamber 10 is associated with one or zero light source 22. Within the context of the invention, the expression according to which a light source 22 is associated with one chamber 10, and vice versa, means that said light source 22 is arranged in front of the reflecting surface 14 of said chamber 10.

The illuminating device 2 comprises n-m decorative pieces 24 arranged on the printed circuit board 16. Here, the illuminating device 2 comprises two decorative pieces 24. FIG. 3 illustrates a portion of the illuminating device 2 comprising one of these decorative pieces 24. Each of the decorative pieces 24 is associated with one different chamber 10 of the reflecting device 6. In other words, each decorative piece 24 is associated with only one chamber 10, and each chamber 10 is associated with one or zero decorative piece 24. Within the context of the invention, the expression according to which a decorative piece 24 is associated with one chamber 10, and vice versa, means that said decorative piece 24 is arranged in front of the reflecting surface 14 of said chamber 10. Due to the number of chambers 10, light sources 22 and decorative pieces 24, each chamber 10 is associated with either a light source 22 or a decorative piece 24.

The decorative pieces 24 are decorated so as to have the same appearance of a light source 22 when it is in an off state, that is to say when it does not emit light. The size of the decorative pieces 24 is substantially same as the size of the light sources 22, but according to alternative embodiments, the decorative pieces may be smaller than the light sources and produce roughly the same visual effect, or the decorative pieces may be up to twice bigger than the light sources and produce roughly the same visual effect. Here, the decorative pieces 24 are made of tin. As illustrated in FIG. 4, the decorative pieces 24 are located in holes provided in the solder mask 20, preferably within a focal area of the reflecting surface 14 of the chamber 10 it is associated with or within a distance, equal to the greatest dimension of the decorative piece 24, of said focal area. For example, if the decorative pieces 24 are square-shaped, the greatest dimension of a decorative piece 24 is equal to the length of one of its sides.

When the light sources 22 are in the off state, a person is observing the illuminating device 2 from the front sees the reflection of the light sources 22 and of the decorative pieces 24 through the reflecting surfaces 14 of each of the chambers 10 of the reflecting device 6. By making the decorative pieces 24 having a similar appearance than of the light sources 22 in the off state, the images of the decorative pieces 24 and the images of the light sources 22 through reflection are similar and harmonious, which do not undermine the appearance of illuminating device 2 and of the vehicle it is installed in.

The invention is not limited to the presented embodiments and other embodiments will clearly appear to the skilled person.

REFERENCES LIST

2: illuminating device
4: frame
6: reflecting device
8: connecting means
10: chamber
12: main axis

14: reflecting surface
16: support
18: conductive layer
20: solder mask
22: light source
24: decorative piece

The invention claimed is:

1. An illuminating device (2) adapted for vehicle exteriors, the illuminating device comprising:

a reflecting device (6) comprising n chambers (10) aligned along a main axis (12) of the reflecting device (6), with n being an integer superior or equal to 2, each chamber (10) comprising a reflecting surface (14), a support (16), and m light sources (22), with m being an integer strictly inferior to n, arranged on the support (16) and configured to illuminate the reflecting device (6), each light source (22) being associated with one different chamber (10), characterized in that the illuminating device further comprises n-m decorative pieces (24) arranged on the support (16), each decorative piece (24) being associated with one different chamber (10) such that each chamber (10) is associated with either a light source (22) or a decorative piece (24).

2. The illuminating device (2) according to claim 1, wherein the light sources (22) comprise light-emitting diodes.

3. The illuminating device (2) according to claim 1, wherein the light sources (22) and the decorative pieces (24) are each arranged in front of the reflecting surface (14) of the chamber (10) they are associated with.

4. The illuminating device (2) according to claim 1, wherein the support (16) is a printed circuit board which comprises a conductive layer (18) and a solder mask (20) arranged on the conductive layer (18), the solder mask (20) being dark-coloured, preferably black-coloured.

5. The illuminating device (2) according to claim 4, wherein the light sources (22) are arranged on the solder mask (20).

6. The illuminating device according to claim 4, wherein the solder mask (20) comprises holes each configured to receive one of the decorative pieces (24).

7. The illuminating device (2) according to claim 1, wherein the decorative pieces (24) are made of tin.

8. The illuminating device (2) according to claim 1, wherein each decorative piece (24) is positioned either at a focal area of the reflecting surface (14) of the chamber (10) it is associated with or within a distance, equal to the greatest dimension of the decorative piece (24), of said focal area.

9. The illuminating device (2) according to claim 1, wherein the decorative pieces (24) are the same size as the light sources (22), smaller than the light sources (22) or up to twice bigger than the light sources (22).

* * * * *